(12) United States Patent
Addy et al.

(10) Patent No.: US 6,294,992 B1
(45) Date of Patent: Sep. 25, 2001

(54) HIGH POWER CONTROL SIGNAL TRANSMISSION AND LOW POWER DATA SIGNAL TRANSMISSION IN A WIRELESS SECURITY SYSTEM

(75) Inventors: Kenneth L. Addy, Massapequa; Thomas P. Schmit, Huntington; Patrick Adamo, Bellmore, all of NY (US)

(73) Assignee: Pittway Corp., Chicago, IL (US)

( * ) Notice: Subject to any disclaimer, the term of this patent is extended or adjusted under 35 U.S.C. 154(b) by 0 days.

(21) Appl. No.: 09/063,752

(22) Filed: Apr. 21, 1998

Related U.S. Application Data

(63) Continuation-in-part of application No. 08/998,504, filed on Dec. 26, 1997, and a continuation-in-part of application No. 08/516,162, filed on Aug. 17, 1995, now Pat. No. 5,822,373.
(60) Provisional application No. 60/043,737, filed on Apr. 21, 1997, provisional application No. 60/044,503, filed on Apr. 21, 1997, and provisional application No. 60/044,511, filed on Apr. 21, 1997.

(51) Int. Cl.[7] ............................... G08B 1/08; H04Q 7/00

(52) U.S. Cl. .......................... 340/539; 340/514; 455/38.3

(58) Field of Search ..................................... 340/539, 514, 340/531, 693.3, 825.69, 825.72, 825.06, 825.44; 455/38.3, 127

(56) References Cited

U.S. PATENT DOCUMENTS 5,461,365 * 10/1995 Schlager et al. ...................... 340/539
5,801,626 *  9/1998 Addy ................................... 340/539

* cited by examiner

Primary Examiner—Donnie L. Crosland
(74) Attorney, Agent, or Firm—Greenberg Traurig, LLP; Anthony R. Barkume

(57) ABSTRACT

A method, apparatus and system for maximizing transmission power levels in wireless security systems wherein the transmitted power is adjusted depending on the type of signal being transmitted in order to comply with power level restrictions imposed by agency regulations (e.g. Federal Communications Commission). Higher priority control signals messages are transmitted at the maximum permitted or normal output power level and are not compromised by the requirement for transmission of data signals that are transmitted at a reduced power level. In addition, a method and apparatus for reducing a required quantity of data signal transmissions in wireless security systems is provided, wherein data signals are exclusively transmitted at a reduced power level during an installation mode leaving only control signals to be transmitted at normal power during normal operation mode. Data information contained in the data signal is stored in a console during installation mode, and retrieved and displayed to the user in response to the control signal during normal operation mode. The reduction in data signal transmissions reduces on-air time, thereby reducing the potential for message clash.

29 Claims, 11 Drawing Sheets

HIGH POWER CONTROL SIGNAL TRANSMISSION AND LOW POWER DATA SIGNAL TRANSMISSION IN A WIRELESS SECURITY SYSTEM

CROSS-REFERENCE TO RELATED APPLICATIONS

This patent application is a continuation-in-part of U.S. application Ser. No. 08/516,162, filed on Aug. 17, 1995, U.S. Pat. No. 5,822,373 and U.S. application Ser. No. 08/998,504, filed on Dec. 26, 1997, both of which are incorporated by reference herein. This application also claims priority of United States provisional application Ser. Nos. 60/043,737, 60/044,511 and 60/044,503, which were filed on Apr. 21, 1997 and all three of which are hereby incorporated by reference.

BACKGROUND OF THE INVENTION

The present invention relates to communication devices and protocols such as those used in wireless security systems having multiple alarm sensors in communication with one or more control systems; and in particular to such security systems where the transmitter is designed to transmit messages at different power levels.

Wireless transmissions in the United States are regulated by the Federal government. Agencies outside of the United States regulate wireless transmissions, as well. For example, wireless transmissions in Europe are regulated by such agencies as European Telecom Standards Institute (ETSI) and other national agencies. In the United States, the Federal Communications Commission ("FCC") issues federal regulations affecting wireless data transmissions. These regulations are found in the Code of Federal Regulations, Title 47, Part 15 (47 CFR §15). The term "message", as used herein, generally refers to the information content of a signal, whereas the term "signal" generally refers to the actual transmission and its electromagnetic properties. However, these terms may be used interchangeably in order to promote clarity within a particular context.

The FCC allocates frequency bands for certain types of wireless transmissions. These frequency bands are either "licensed" or "license exempt". If a wireless transmitter is designed to transmit within a frequency for which a license is required (a "licensed frequency"), the operator of the wireless equipment must pay the government a license fee for each radio installed. If a wireless transmitter is designed to transmit within a frequency for which no license is required (a "license exempt frequency"), no license fee is required. For wireless transmission applications having a large number of transmitters, or where the overall wireless information system is inexpensive, the license fee is prohibitively expensive for a commercially competitive product.

The FCC also designates wireless transmissions as either a primary or a secondary user of a frequency. A primary user of a frequency is one that the FCC protects from interference by other transmissions. One example of a primary user is an airport instrument landing system. Such users are protected from interference by not allowing other transmissions on the delegated frequency band because these transmissions guide airplanes to safe landings. Secondary users of frequencies do not enjoy this protection from interference. Secondary frequencies include, for example, frequencies for garage door openers and remote controls. These systems do not involve the same safety considerations that necessitate FCC protection.

The FCC imposes several constraints on license exempt, secondary transmissions. Federal regulations require that the transmissions maximum field strength be calculated as the average field strength over a complete pulse train, provided that the pulse train does not exceed 100 ms. If the pulse train exceeds 100 ms, the field strength is determined as the average absolute voltage over 100 ms. If the emissions are pulsed, rather than constant, the emissions may be transmitted in less than 100 ms, rather than spread out over the entire 100 ms. Because the field strength of pulsed emissions are measured as an average over a 100 ms period, the field strength transmitted during this time may be greater than that which may be transmitted if sent by a constant signal over the entire 100 ms period. For example, if a pulsed signal train is "on the air" for only 50 ms of the 100 ms period, it may be transmitted with double the maximum field strength of a substantially similar constant signal. The FCC limits the transmission of the total allowed power to no less than 10% of the allotted time (i.e., no less than 10 ms). That is, the peak power cannot exceed one hundred times the average allowed power over the entire 100 ms period. These parameters create an incentive to reduce the transmission "on time" to as small as possible (down to 10 ms) to allow for greater transmission power than if the signal was "on" for the entire 100 ms period.

For this reason, certain transmission types are preferred over others for license exempt, secondary transmission applications. For example, frequency modulation (FM) signals are not preferred because they are constantly "on". On-off-keyed amplitude modulation (OOK-AM) is preferred because the signal is off except when data is being transmitted (i.e, not unlike Morse code), and it is inexpensive and simple to implement. Additional encoding schemes which are commonly used include pulse position modulation (PPM) (where the position of a pulse in a self-clocked signal conveys data) and biphase Manchester (where the transition of a signal from one value to another within a bit interval conveys data and the clock).

Constant carrier signals (i.e., constantly "on") are not preferred because they cannot take as much advantage of peak to average power ratio calculation when compared with, for instance, a constant carrier signal such as OOK-AM. For example, a Manchester encoded OOK-AM signal containing 10 bits of information will be on no more than 50% of the on-air time. Thus, the transmission can occupy 20 ms and will have an average "on time" of 10% of the FCC average period. On the other hand, a constant carrier FM signal can occupy only 10 ms periods in order to satisfy the FCC averaging limitation. Therefore, to transmit 10 bits of information, the amplitude modulation can be sent at 10 bits/20 ms=500 Hz data rate, whereas the constant carrier signal must be sent at 10 bits/10 ms=1 KHz in order to take advantage of the full 10% averaging permitted by the FCC. Because the FM data rate is higher, the receiver bandwidths must be wider thus compromising the receiver sensitivity and selectivity.

The PPM and biphase Manchester techniques are often preferred because they efficiently use the power/time (duty cycle) constraints and because they are self-clocking (i.e., the techniques transmit a synchronization pulse or edge from which the position of the data pulse is compared). Self-clocking signals are often preferred because the data timing in the inexpensive transmitters is often poor and, therefore, self-clocking signals are necessary for the receiver or decoder to operate satisfactorily.

Another technique, the non-return-to-zero (NRZ) technique, transmits digital information, and is only "on"

(i.e., it only transmits) when the digital signal is a logical "1. This technique is quite efficient and can operate at less than half the data rate of the PPM or biphase Manchester techniques for equal information transfer. This is because in the biphase Manchester technique each bit-cell is divided by 2 to provide the transitions. PPM requires two or more bit cells to convey information depending on the number of possible pulse positions. The NRZ information is conveyed in a single bit-cell, thus, the bit rate equals the baud rate because each bit is equal to the clock rate. However, the NRZ technique duty cycle is entirely dependent on the data content. This means that the more "1's" contained in the digital data signal, the more "on-air" time needed to transmit the signal. Thus, it is at least equally likely that there will be more than 50% "1's". An NRZ signal may not be able to take advantage of the peak-to-average-power ratio because it will be "on air" for more than the minimum regulatory averaging period, reducing the power which may be used to transmit the signal. Also NRZ is not self clocking. For these reasons, NRZ has not previously been preferred for use in prior license exempt, secondary wireless transmission systems.

Governmental and commercial constraints placed on license exempt bands impose conflicting requirements for wireless security systems. The relatively low power level permitted requires (1) as short a transmission on time as possible, and (2) a highly sensitive receiver to reliably detect transmissions at a reasonable distance. The license exempt bands are secondary frequency bands, which have a greater likelihood of interference from other applications in the same band (i.e., the band is not protected from interference). Thus, the receiver must also be highly selective to avoid unwanted interference Therefore, it would be advantageous if a communications system suitable for use with wireless security systems could provide means for transmitting both data information and control information while at the same time reducing message length and on-air time of the transmitted message. This would be desirable to reduce the probability of message clash (i.e., probability of interference between two or more messages at any given time) and compliance with the high peak to average power ratio as limited in accordance with FCC regulations.

Most radio frequency (RF) wireless security systems available today, such as those manufactured by Alarm Manufacturing Device Co. (ADEMCO) 165 Eileen Way, Syosset, N.Y. 11791, employ a multiplicity of transmitters in communication with a central receiver control unit. The information transmitted typically describes the state of various transducers or sensors associated with each transmitter, such as smoke, motion, breaking glass, shock and vibration detectors; door, window and floor mat switches; etc. These transmitters are designed to be inexpensive to manufacture and generally are capable of transmission only rather than reception only or transmission and reception, which would add significant cost to the design.

The Federal Communications Commission (FCC) regulates operation of low power radio devices under Part 15.231 of the Code of Federal Regulations, which deals with the operation of devices used to control security applications. The regulations specify a maximum permissible power level for control applications as well as a reduced power level including additional duty cycle restrictions for data applications. The difference between the maximum permissible transmission power levels for control and data applications is 8 dB. The additional 8 dB permissible for control application transmissions becomes significant in wireless security systems, which use low power levels for transmission. Data applications are also limited by FCC regulations to no more than one second in duration with a silent period between data transmissions of at least thirty times the duration of the data transmission.

A recent innovation in security applications is the use of two-way wireless consoles or display units. These consoles are portable devices that control and interrogate the security system for status. For example, the 5827BD and 5804BD are two such consoles manufactured by ADEMCO. These wireless consoles are designed to be either portable or permanently installed in a readily accessible location, which reduces the high costs associated with wiring a conventional wired console. One limitation of these devices is that they are intended to operate as control devices as defined in accordance with FCC regulations. As such these devices indicate status by activating a light emitting diode (LED) display, which is simply either on or off.

In contrast, conventional wired consoles are much more sophisticated and often display complex messages descriptive of the system status in a textual format (e.g., "FAULT MASTER BEDROOM WINDOW"). Complex messages such as these are regarded as data messages under FCC regulations. According to FCC regulation, such data messages are not to be transmitted at the same power (i.e., normal power) at which control messages are transmitted. Instead, these data messages can only be transmitted at a reduced power level, which is 8 dB below that of control message transmissions. This reduction in transmission power levels for data messages causes a reduction in both the range and reliability of the security system. Addressing and identification information such as which zone an alarm originated in is permissible within control messages, however, any enhancement of that information required by the security system is considered to be data and requires a reduction in transmitted power.

Therefore, it would be advantageous if a communications system suitable for use with wireless security systems could provide means for transmitting both data information and control information at their respective maximum power levels permitted under FCC regulations, thus maximizing the signal-to-noise ratio (SNR) for all message transmissions and reducing errors in reception.

The reduced power level required for the transmission of data information increases the probability of errors in reception due to the decrease in the SNR as compared with transmissions of control information. During the installation of wireless security systems, when the wireless console can be placed relatively near or at a reduced distance from the control system (e.g., less than six feet), the distance over which data information is transmitted is not limited and thus errors in reception are substantially non-existent. However, during normal operation the user is permitted to use the wireless console at relatively greater distances or at a normal distance (e.g., up to 500 feet) from the control system which may induce errors in the reception of data information at reduced power levels required for transmission of data information.

Therefore, it would be advantageous if a method and apparatus suitable for use with wireless security systems could alleviate the need for transmissions of data information during normal operation of the wireless security system when transmission distances are substantially greater than that experienced during installation. In addition, reducing the quantity of transmissions of data information is advantageous since on-air time is thereby reduced, which results in a reduction in the potential for clash between message transmissions.

SUMMARY OF THE INVENTION

In accordance with the present invention, a method for maximizing transmission power levels in wireless security systems is provided, which comprises the steps of generating a message, generating a transmission power control signal comprising one of at least two states at any given time dependent upon whether the message comprises data and/or control information, and transmitting a signal comprising the message at a power level indicated by the state of the transmission power control signal. The signal is transmitted at a reduced power level when the transmission power control signal indicates that the signal comprises data information, and a normal power level when the transmission power control signal indicates that the signal comprises control information.

In further accordance with the present invention, an apparatus for maximizing transmission power levels in wireless security systems is provided, which comprises a processing unit and a transmitter. The processing unit is adapted to generate a modulating signal and a transmission power control signal. The modulating signal comprises a message, and the transmission power control signal comprises one of at least two states at any given time dependent upon whether the message comprises data and/or control information. The transmitter is adapted to transmit a signal comprising the message at a power level indicated by the state of the transmission power control signal. The transmitter is adapted to transmit the signal at a reduced power level when the transmission power control signal indicates that the signal comprises data information, and a normal power level when the transmission power control signal indicates that the signal comprises control information. The processing unit is adapted to generate a substantially unique preamble, control information and/or data information, data CRC and/or control CRC. The preamble is indicative of whether the message comprises control information and/or data information, however, the preamble may be omitted in a particular message in reliance on the prior history of messages in order to determine the current content of the message without a preamble. The message comprises the preamble and the control and/or data information and data CRC and/or control CRC. The transmitter may further comprise an oscillator, a modulator and an antenna. The oscillator is adapted to generate a carrier signal and the modulator is adapted to modulate the carrier signal with the modulating signal. The modulating signal comprises data and/or control information and the modulator is adapted to control amplification of the modulated carrier signal in accordance with the state of the transmission power control signal. The antenna is adapted to radiate the modulated carrier signal.

In still further accordance with the present invention, a wireless security system for maximizing transmission power levels is provided, which comprises an alarm sensor adapted to transmit a control signal, a central receiver adapted to receive the control signal, a central transmitter, a console and a control system. The central transmitter comprises a processing unit, an oscillator, a modulator and an antenna. The processing unit is adapted to generate a modulating signal and a transmission power control signal. The modulating signal comprises a message, and the message comprises control and/or data information. The transmission power control signal comprises one of at least two states at any given time dependent upon whether the message comprises data and/or control information. The oscillator is adapted to generate a carrier signal. The modulator is adapted to modulate the carrier signal with the modulating signal. The modulator is adapted to control amplification of the modulated carrier signal in accordance with the state of the transmission power control signal. The antenna is adapted to radiate the modulated carrier signal. The control system is adapted to communicate with the central receiver and the central transmitter. The console is adapted to receive a data and/or control signal comprising the modulated carrier signal from the central transmitter, decode the message into control and/or data information, perform tasks associated with the control information, and display the data information. The modulator is adapted to control amplification of the modulated carrier signal to a normal power level when the transmission power control signal indicates the modulated carrier signal comprises control information, and to a reduced power level when the transmission power control signal indicates the modulated carrier signal comprises data information.

In accordance with the present invention, a method for reducing a required quantity of data signal transmissions in wireless security systems is provided, which comprises the steps of transmitting a data signal comprising display data and an address pointer during an installation mode, receiving the data signal, storing the display data in a memory location indicated by the address pointer, transmitting a control signal comprising the address pointer during a normal operation mode, receiving the control signal, retrieving the display data from the memory location indicated by the address pointer, and displaying the display data. The data signal is transmitted at a reduced power level and the control signal is transmitted at a normal power level. The data signal is transmitted over a reduced distance during the installation mode, and the control signal is transmitted over a normal distance during the normal operation mode. The steps of transmitting the data signal, receiving the data signal, and storing the display data are selectively iterated for each data message as required by the user for additional storage of data information. The steps of transmitting the control signal, receiving the control signal, retrieving the display data, and displaying the display data are selectively iterated as required by the user in accordance with the particular control message. The method further comprises generating a transmission power control signal, and transmitting the data signal and the control signal at a power level indicated by the transmission power control signal.

In further accordance with the present invention, an apparatus for reducing a required quantity of data signal transmissions in wireless security systems is provided, which comprises a transmitter and a console. The transmitter is adapted to transmit a data signal comprising display data and an address pointer during an installation mode. The transmitter is also adapted to transmit a control signal comprising the address pointer during a normal operation mode. The console is adapted to receive the data signal and store the display data in a memory location indicated by the address pointer. The console is also adapted to receive the control signal, retrieve the display data from the memory location indicated by the address pointer, and display the display data. The data signal is transmitted at a reduced power level, and the control signal is transmitted at a normal power level. The data signal is transmitted over a reduced distance during the installation mode, and the control signal is transmitted over a normal distance during the normal operation mode. The transmitter iteratively transmits the data signal and the console iteratively receives the data signal and stores the display data. The transmitter iteratively transmits the control signal and the console iteratively receives the control signal, retrieves the display data, and displays the display data. The transmitter generates a transmission power control signal and transmits the data signal and the control signal at a power level indicated by the transmission power control signal.

In still further accordance with the present invention, an apparatus for reducing a required quantity of data signal transmissions in wireless security systems is provided, which comprises a console comprising a radio frequency receiver, a memory unit, a display, and a microprocessor. The radio frequency receiver is adapted to receive the data signal and the control signal. The microprocessor is adapted to derive the display data and the address pointer from the data signal, the microprocessor is adapted to store the display data in a location in the memory unit indicated by the address pointer, the microprocessor is adapted to derive the address pointer from the control data, retrieve the display data from the location in memory indicated by the address pointer, and display the display data on the display. The console may also comprise a keypad for manual entry of the display data and the address pointers.

DETAILED DESCRIPTION OF THE PREFERRED EMBODIMENT

Figure 1:
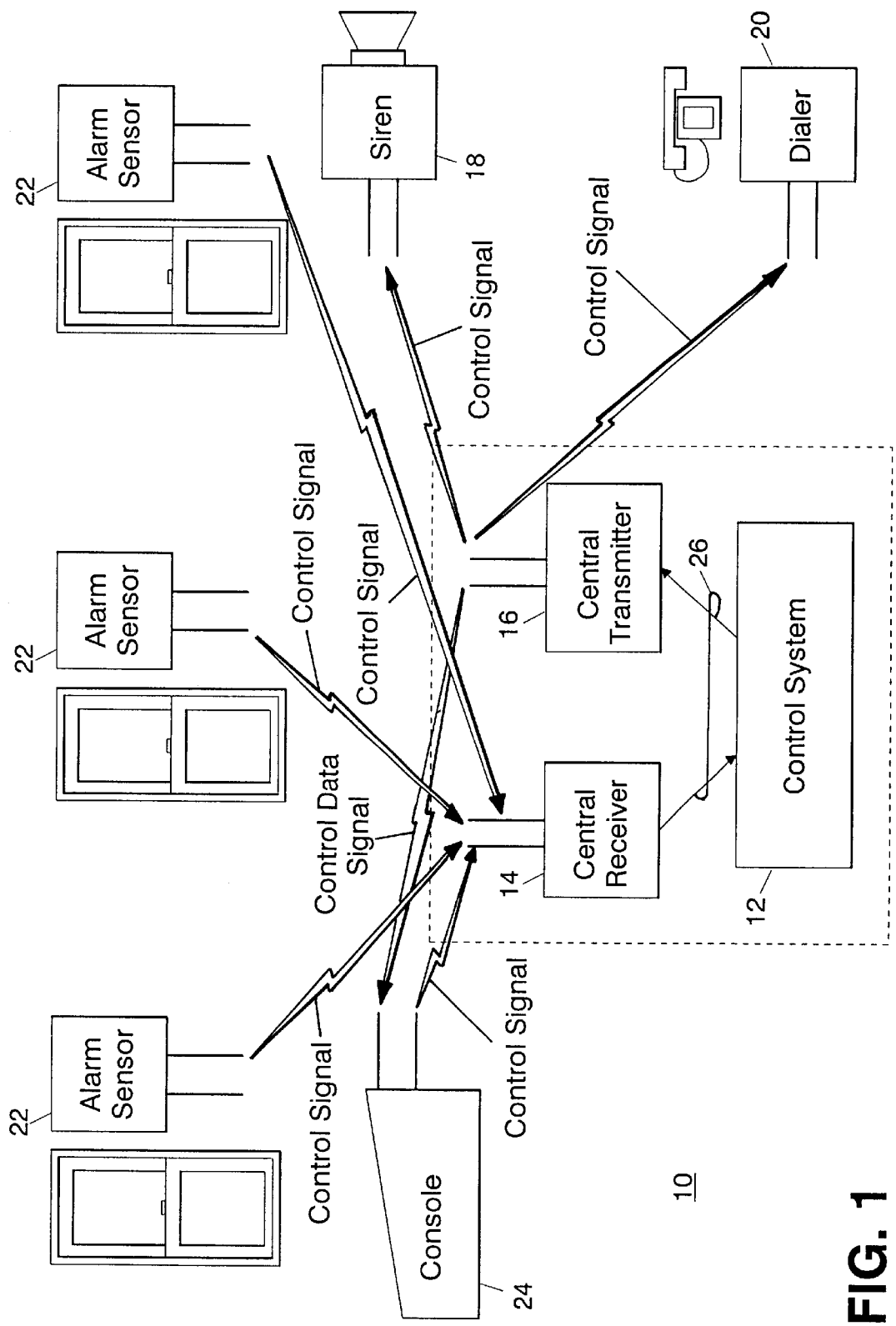
FIG. 1 is a block diagram of a security system utilizing a dual power central transmitter of the present invention.

FIG. 1 illustrates a block diagram of a security system 10, which comprises a control system 12, a central receiver 14, a dual power central transmitter 16, a siren 18, a dialer 20, a plurality of alarm sensors 22, and a console 24. The central receiver 14 is in communication with the plurality of alarm sensors 22 and comprise, for example, motion detectors, fire or smoke sensors, glass breakage detectors, door or window entry sensors, and similar sensors well known in the art. In the preferred embodiment, the security system 10 operates in a so-called "wireless" fashion by electromagnetic wave transmission (e.g., radio frequency waves) between the alarm sensors 22, console 24, central receiver 14 and dual power central transmitter 16. A transmitter (not shown) within each alarm sensor 22 transmits control signals comprising control messages modulating a radio frequency signal (e.g., 345 MHz). The control system 12 is connected via wires 26 to the central receiver 14 and dual power central transmitter 16. The control signals are received, processed, decoded by the central receiver 14 and made available to the control system 12, thereby enabling the control system 12 to access information contained within the control message and act accordingly (e.g., by sounding a siren via a control signal to the dual power central transmitter 16, activating the dialer 20 to call the police or fire station via a control signal to the dual power central transmitter 16, etc.). The central receiver 14 also receives control signals from the console 24. Further detail regarding wireless security systems may be found in U.S. Pat. No. 4,754,261 to Marino, which is owned by the assignee of the present invention and is hereby incorporated by reference. The signals described thus far are classified as control signals and are transmitted at the higher or normal power permitted by the FCC. However, the console 24 also receives data information in the form of a control/data signal comprising control and/or data messages. Data information comprises user friendly information that provides greater detail and an enhanced description of the operation of the system 10 to the user such as "Johnny's bedroom window is open". According to FCC regulations, the data information can not be transmitted at normal power and must be transmitted at reduced power levels that are approximately 8 dB less than normal power.

Figure 2A:
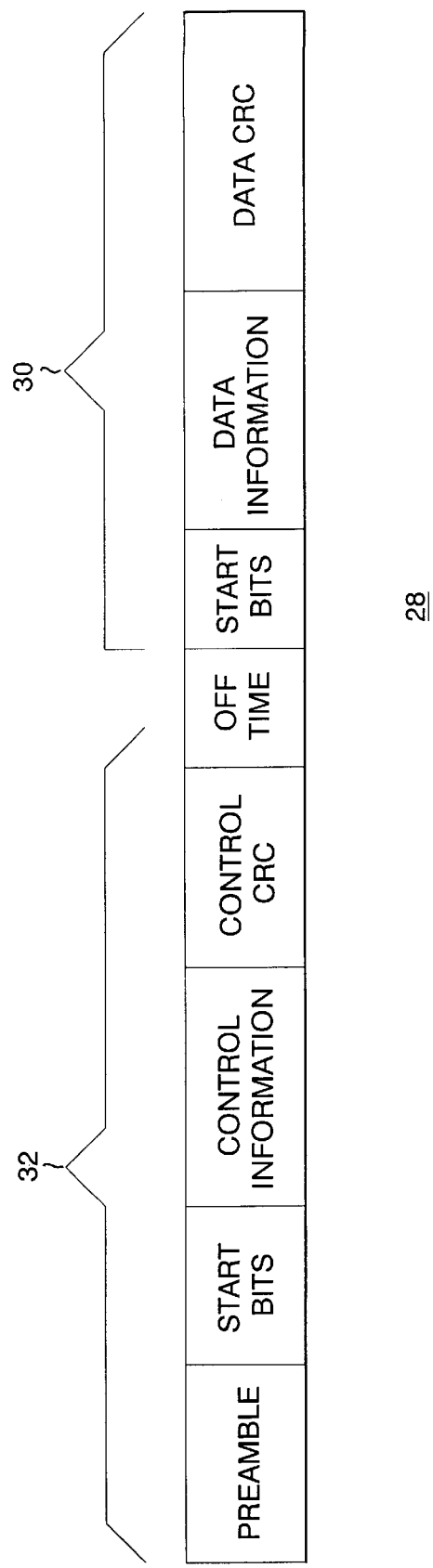
FIG. 2A illustrates components of a message comprising both control and data information.

FIG. 2A illustrates the format of a typical message 28 comprising both control and data information in the form of a control portion 32 and a data portion 30. The control portion 32 comprises control information framed by start bits, which signal the beginning of the control information, and a Cyclic Redundancy Code (CRC), which provides error detection and correction of the control information by means well known in the art. Subsequent to an off time, the data portion 30 is optionally transmitted comprising data information similarly framed by start bits and CRC. The data information is decoded by the console following successful reception of the higher priority control information. The data portion 30 of the message 28 is transmitted at reduced power while the control portion 32 of the message 28 is transmitted at normal power. A transmission power control signal switches state during the off time which causes the dual power central transmitter to switch transmission power levels during a period when it is not transmitting. The control portion 32 is used by the siren and dialer to take immediate action during an alarm condition. The control portion 32 is also used by the console to commence standard displays and warning activities such as activation of LED's and audible alarms. The data portion 30 is used by the console to further enhance its display during an alarm condition in order to increase the user's understanding of the message. The message format illustrated in FIG. 2A, in which the message is bisected by a short off period or time, has the advantage that both control and data information are transmitted using a common preamble. This reduces message length and on-air time of the transmitted message, which is desirable to reduce the probability of message clash (i.e., probability of interference between two or more messages at any given time) and to comply with a high peak to average power ratio as limited in accordance with FCC regulations.

Figure 2B:
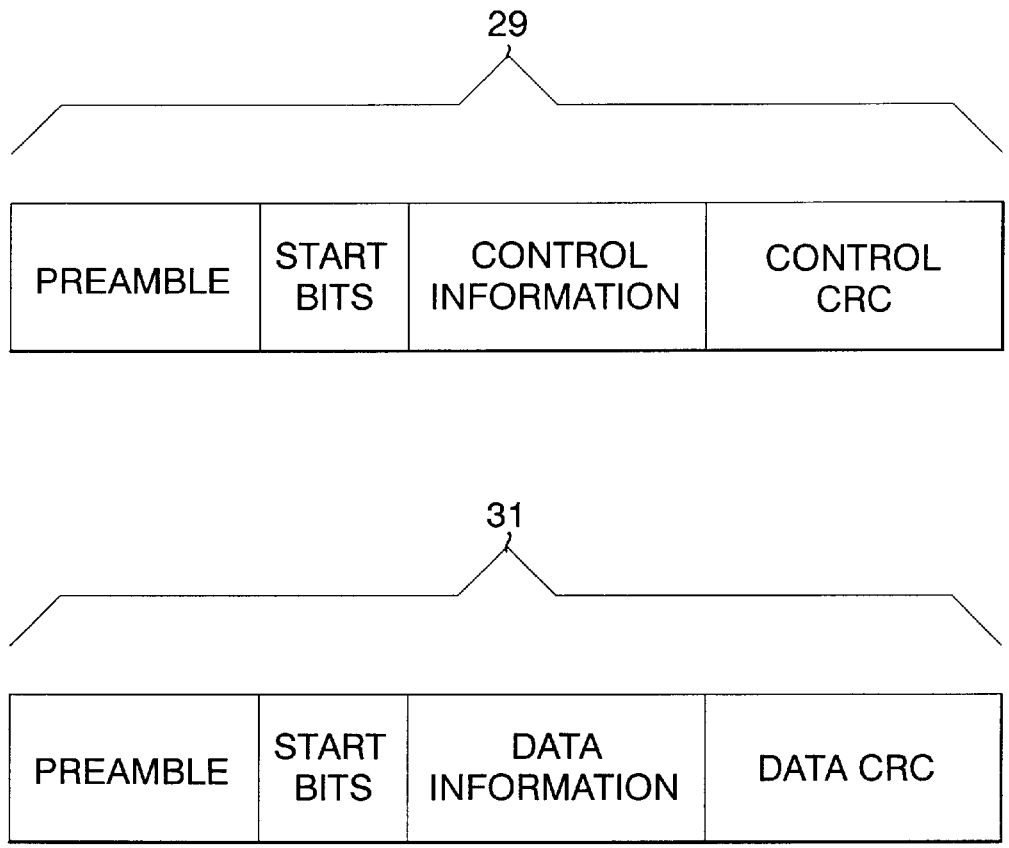
FIG. 2B illustrates components of distinct control and data messages.

FIG. 2B illustrates an alternative embodiment of the message of FIG. 2A wherein the control information and the data information are transmitted as separate and distinct messages and signals having unique preambles. The control signal, comprising a control message 29, is transmitted at normal power and the data signal comprising the data message 31, is transmitted at reduced power. Naturally, in using the messages illustrated in FIG. 2B, the advantages of reduced on-air time, probability of message clash and high peak to average power ratio are no longer present to the same degree as that provided by the message configuration illustrated in FIG. 2A. In addition, the preamble may be omitted in either the control or data message in reliance on the prior history of messages in order to determine the current content of the message without a preamble. For instance, the console can be designed to anticipate a data message after predetermined control messages, thereby alleviating the need for a preamble to be transmitted with the data message. In such an embodiment, start bits are transmitted at the beginning of the data message.

Figure 3A:
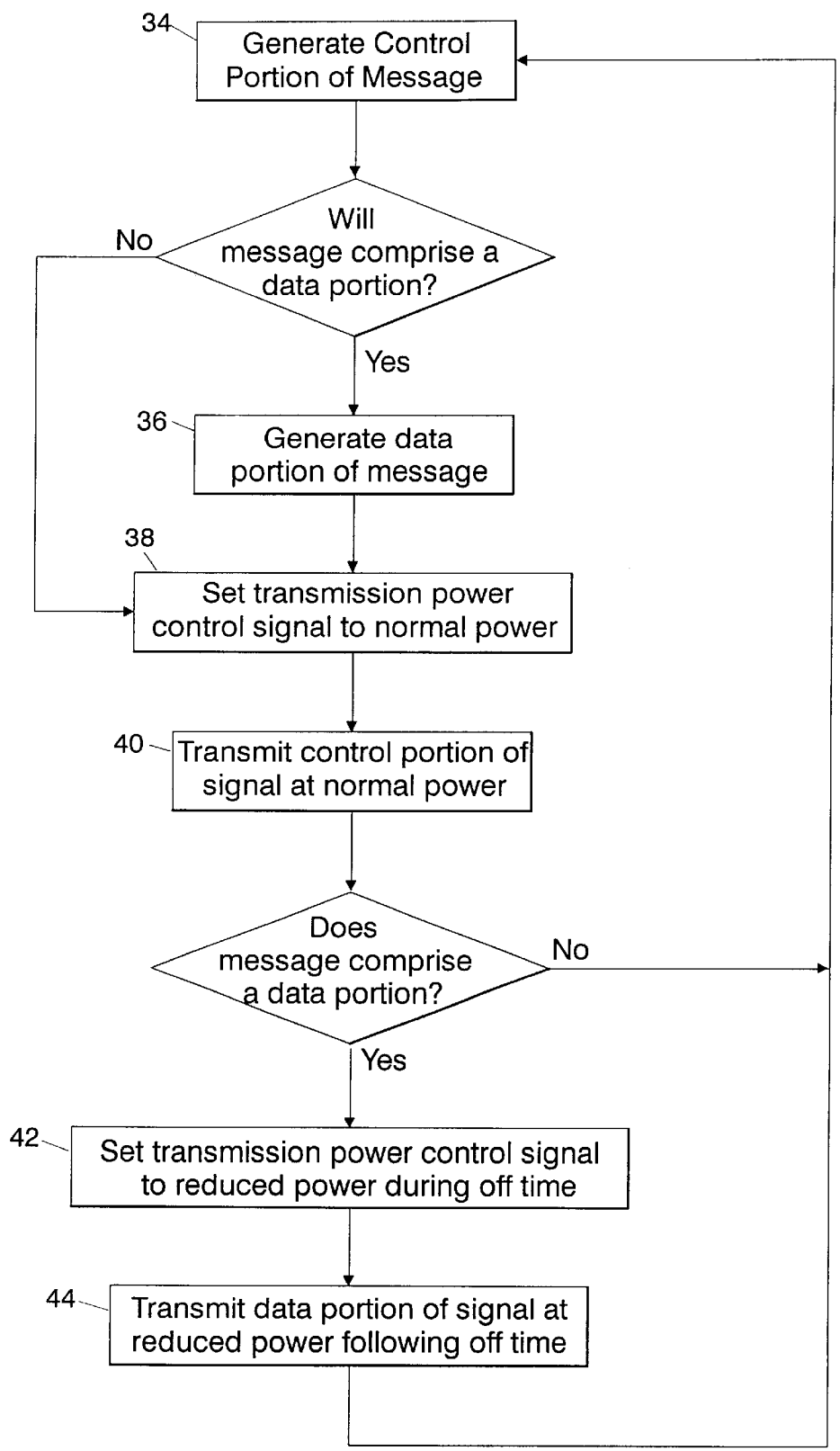
FIG. 3A is a flow chart illustrating operation of the dual power central transmitter of FIG. 1 in which both control and data information can be present in the same message as illustrated in FIG. 2A.

FIG. 3A illustrates the operation of the dual power central transmitter 16 of FIG. 1 wherein the message generated is of the type illustrated in FIG. 2A. Such a message comprises one preamble, control information with associated start bits and control CRC and optionally data information with associated start bits and data CRC. The control portion of the message is generated in step 34 including start bits and control CRC. If the message comprises a data portion, then the data portion, including start bits and the data CRC, is generated in step 36. The transmission power control signal is set to a state signifying that the control portion of the message is to be transmitted at normal power in step 38. Typically, the transmission power control signal is a digital signal comprising at least two states where, for instance, a logical high or one state signifies that the message is to be transmitted at normal power and a logical low or zero state signifies that the message is to be transmitted at reduced power. The control portion of the signal is then transmitted using normal power as indicated by the transmission power control signal in step 40.

If the message comprises a data portion, then the transmission power control signal is set to a state signifying that the data portion is to be transmitted at reduced power in step 42 and the data portion of the signal is transmitted at reduced power in step 44. In addition, the dual power transmitter comprises means to ensure that the on-air time and duration of silent time between transmissions remains in compliance with FCC regulations. If the message is to comprise only a control portion, then the dual power central transmitter returns to step 34 to wait for the next signal following step 40.

Figure 3B:
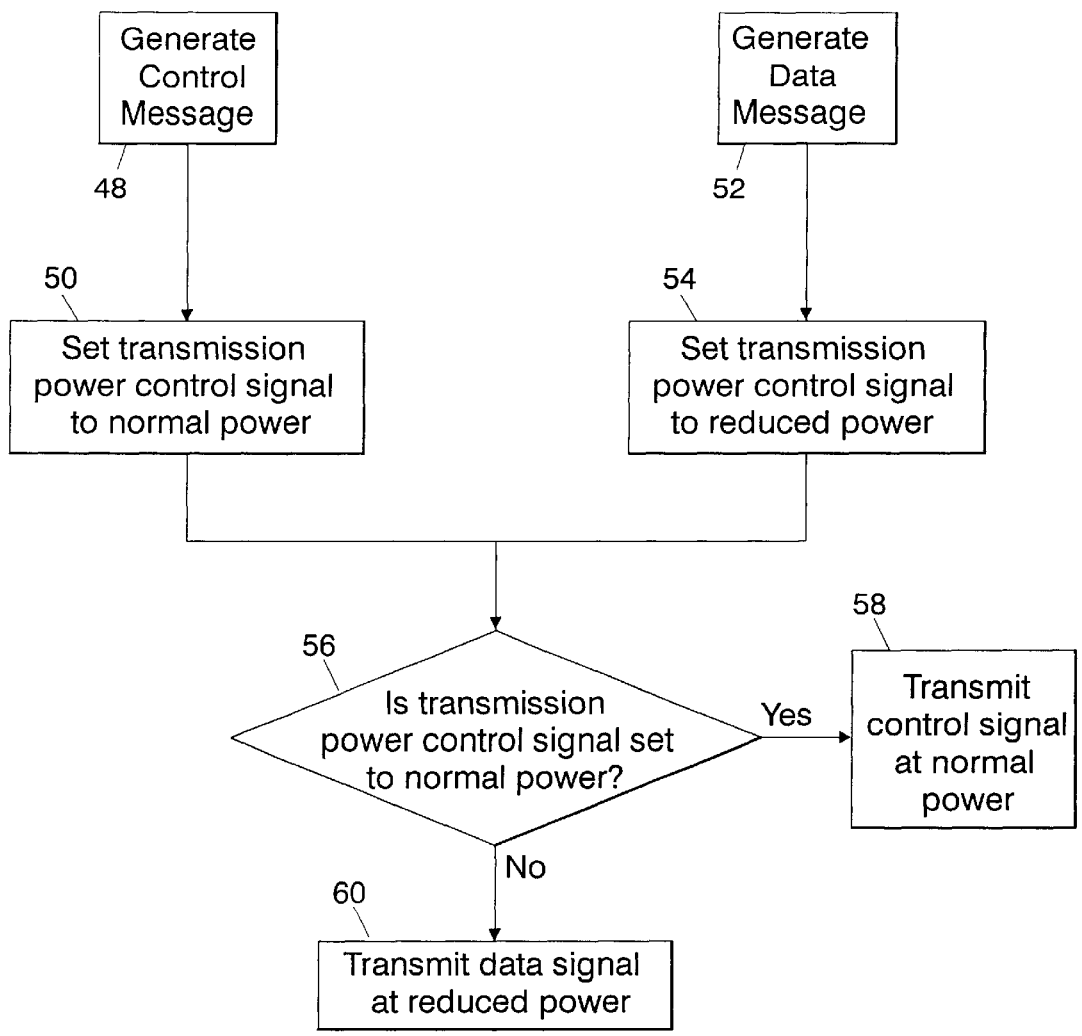
FIG. 3B is a flow chart illustrating operation of the dual power central transmitter of FIG. 1 in which control information and data information are provided in distinct messages as illustrated in FIG. 2B.

Likewise, FIG. 3B illustrates the operation of the dual power central transmitter where the signals transmitted correspond to the separate control and data messages illustrated in FIG. 2B. If it is determined that Control information is to be transmitted, then the control message is generated in step 48 and the transmission power control signal is set to signify transmission of the control message at normal power in step 50. If it is determined that data information is to be transmitted, then the data message is generated in step 52 and the transmission power control signal is set to signify transmission of the data message at reduced power in step 54. Depending upon the state of the transmission power control signal determined in step 56, the signal is either transmitted at normal power in step 58 or reduced power in step 60. In addition, the dual power transmitter comprises means to ensure that the on-air time and duration of silent time between transmissions remains in compliance with FCC regulations.

Figure 4:
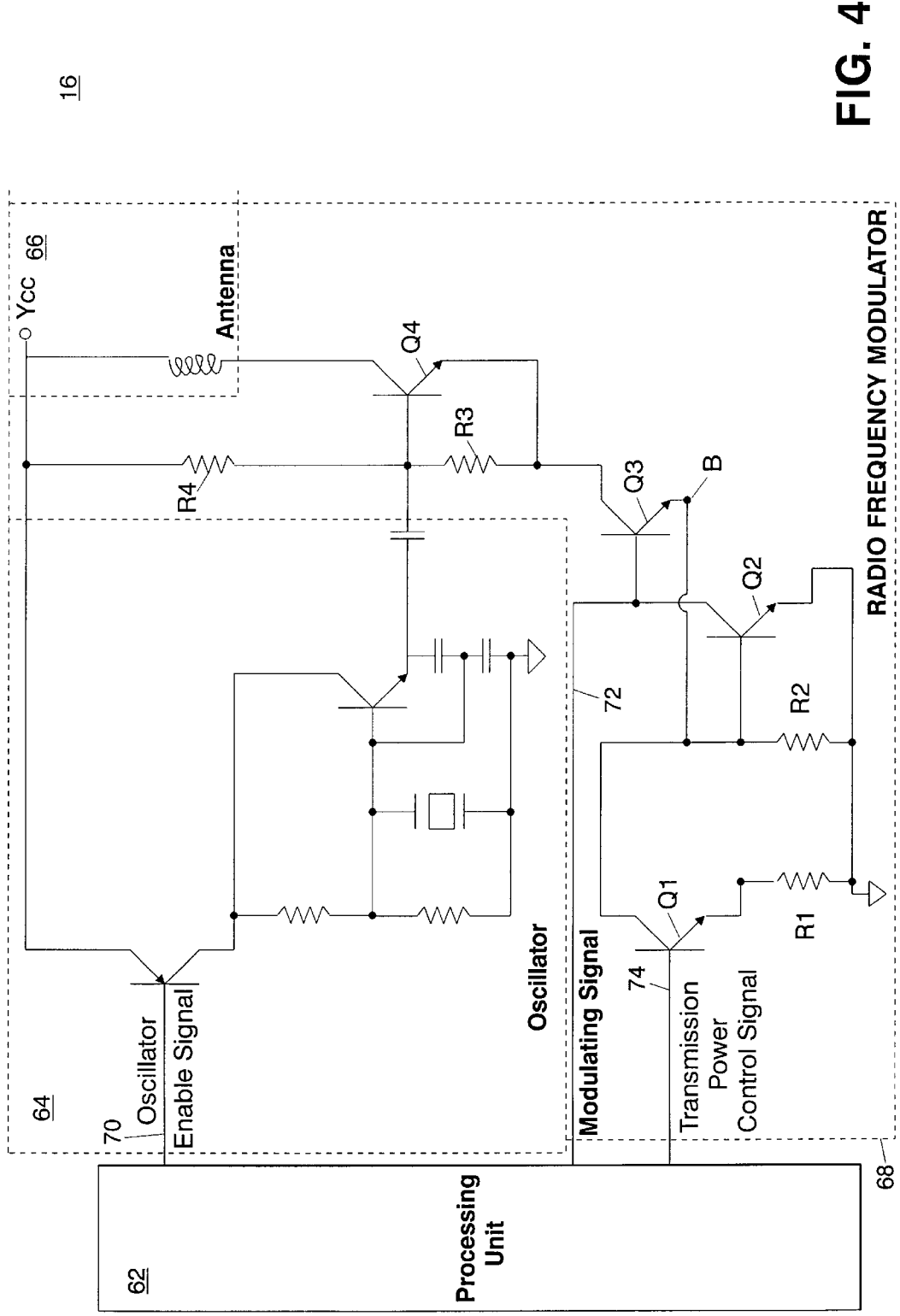
FIG. 4 is a schematic representation of one embodiment of the dual power central transmitter of FIG. 1.

FIG. 4 illustrates a schematic representation of one embodiment of the dual power central transmitter 16 comprising a processing unit or microprocessor 62, an oscillator 64, an antenna 66, and a radio frequency modulator 68. The microprocessor 62 provides an oscillator enable signal 70 that controls operation of the oscillator 64. The oscillator 64 outputs a carrier frequency in a radio frequency band by means well known in the art and comprises a crystal, transistors, resistors, inductors (not shown) and capacitors. The microprocessor 62 also provides a modulating signal 72, which is used to modulate the carrier frequency output by the oscillator 64. The modulating signal 72 comprises information content found in the control and/or data signals to be transmitted such as preambles, start bits, control information, data information, control CRC, and data CRC. In addition, the microprocessor 62 provides the transmission power control signal 74, which directs the radio frequency modulator 68 to transmit the corresponding message at either normal or reduced power.

As illustrated in FIG. 4, the transmission power control signal 74 is used to switch a transistor Q1 either on or off which in turn switches a resistor R1 into or out of the circuit. Switching resistor R1 into the circuit operates to increase the current through a current source defined by transistors Q2 and Q3 and, therefore, the power of the amplification by the radio frequency modulator 68. Transistors Q2 and Q3 also operate to maintain approximately 0.6 v across resistor R2 and, therefore, the value of resistor R2 determines the current through the radio frequency modulator 68. Transistors Q2 and Q3 function as a regulator as well, since the power amplifier defined by transistor Q4 and resistors R3 and R4 as well as the antenna 66 are at a constant DC load. Thus, when resistor R2 is switched into or out of the circuit, the voltage across the radio frequency modulator 68 increases or decreases to vary output power. Thus, by varying the state of the transmission power control signal 74, signals are transmitted at either the normal or reduced power levels in accordance with the classification of information contained in the signal under FCC regulations. The circuit illustrated in FIG. 4, although realized using discrete components, can also be integrated in an Application Integrated Circuit (ASIC) or equivalent techniques well known in the art.

Figure 5A:
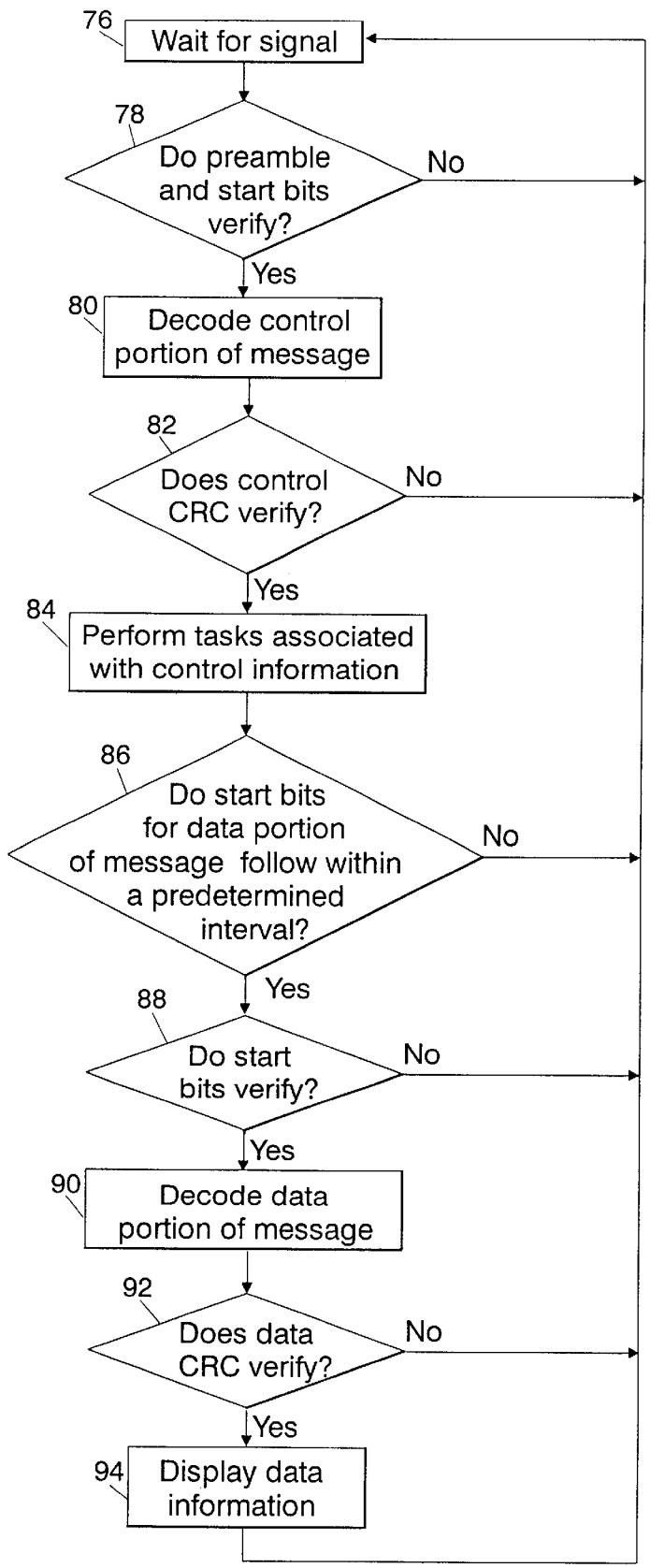
FIG. 5A is a flow chart illustrating operation of a console illustrated in FIG. 1 in which control information and data information can be present in the same message as illustrated in FIG. 2A.

FIG. 5A illustrates the operation of the console 24 shown in FIG. 1 wherein the message received can comprise both control and data information as illustrated in FIG. 2A. The console waits for a signal in step 76 and when the preamble is detected it is verified along with the start bits against a predetermined set of characteristics such as the timing, quantity and identity of these bits in step 78. The receiving circuitry of the console uses the edges of the bits in the preamble to synchronize its circuitry for accurate reception of the remaining portions of the message including the data information. This synchronization counteracts the effect of drift between the receiving circuitry in the console and the dual power central transmitter. The control information is decoded in step 80 and verified using the control CRC in step 82 by means well known in the art. If the control CRC verifies successfully, the tasks associated with the control information are performed in step 84.

If start bits are detected by the console within a predetermined finite time period, such as 100 ms (which is intended purely as an example and not to limit the scope of the present invention), following receipt of the control portion of the message in step 86, and the start bits are successfully verified in step 88, then the data portion is received and decoded in step 90. The data CRC is verified in step 92 and the console displays the data information in step 94. If, during the processing of the message, the start bits, control CRC and/or data CRC do not verify correctly (e.g., steps 78, 82, 88, and/or 92), the message is considered invalid and the console returns to step 76 to wait for the next signal.

Figure 5B:
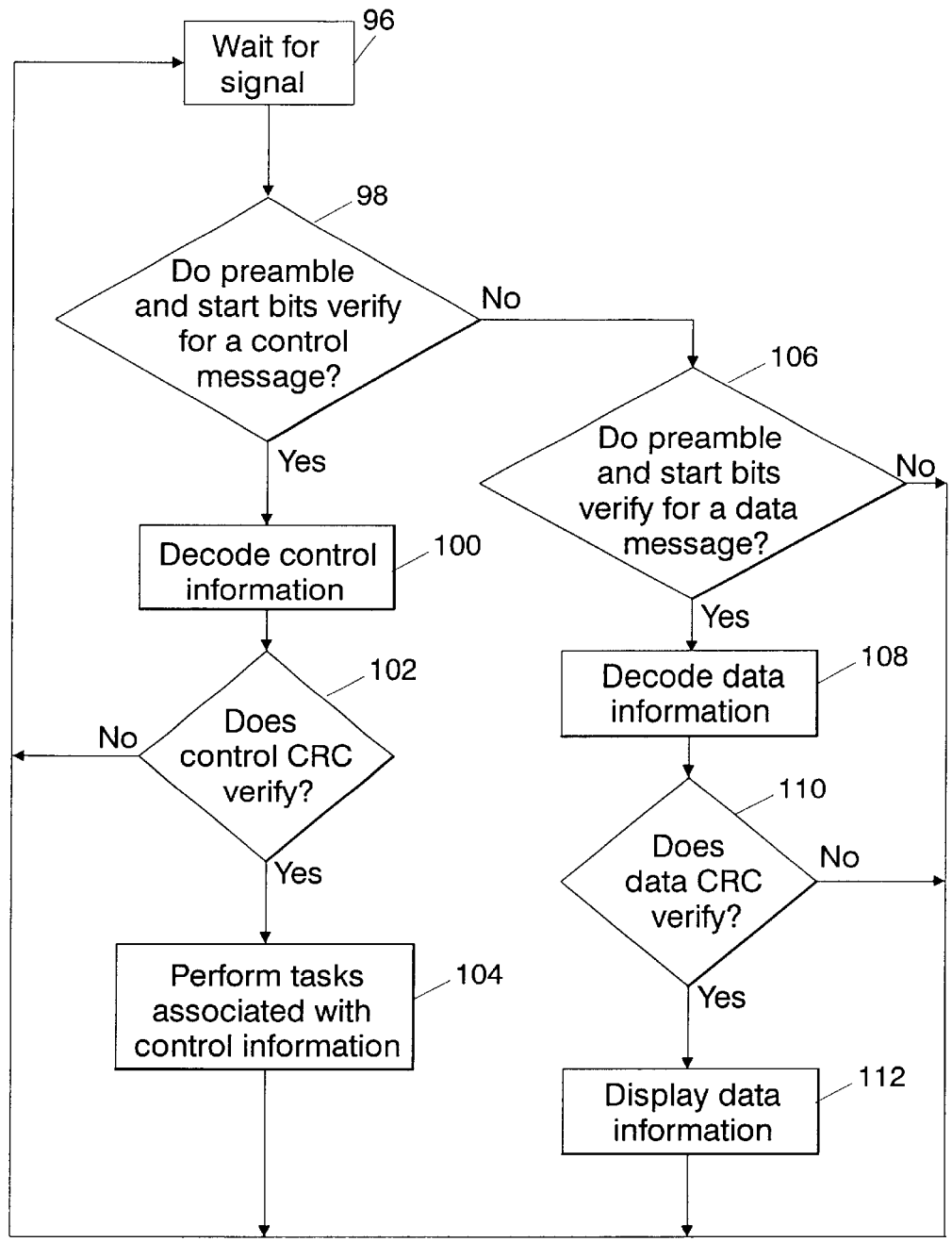
FIG. 5B is a flow chart illustrating operation of the console of FIG. 1 in which control information and data information are provided in distinct messages as illustrated in FIG. 2B.

Similarly, FIG. 5B illustrates the operation of the console 24 shown in FIG. 1 wherein separate signals are received each comprising either control information or data information but not both, as illustrated in FIG. 2B. The console waits for the signal in step 96, and once received verifies the preamble and start bits. The classification of the message as either a control message or a data message is obtained from the preamble in step 98 and if the signal comprises a control message the control information is decoded in step 100. The control CRC is verified in step 102, and if successful, the tasks associated with the control information are performed in step 104. Thereafter, the console returns to step 96 to wait for the next signal.

If the preamble and start bits are not representative of a control message, then they are verified against a predetermined set of criterion characteristic of data messages in step 106. If this verification is successful, the data information is decoded in step 108 and the data CRC is verified in step 110. Upon successful verification of the data CRC the console displays the data information to the user in step 112. If, during the processing of the message, the start bits, control CRC and/or data CRC do not verify correctly (e.g., steps 102, 106 and/or 110), the message is considered invalid and the console returns to step 96 to wait for the next signal.

Thus, by employing the methods and apparatus described above for the embodiment utilizing a common control and data signal as well as the embodiment utilizing distinct control and data signals, all information can be transmitted at the maximum permissible power level in accordance with FCC regulations in order to achieve the greatest possible SNR or signal margin with reference to noise.

Figure 6:
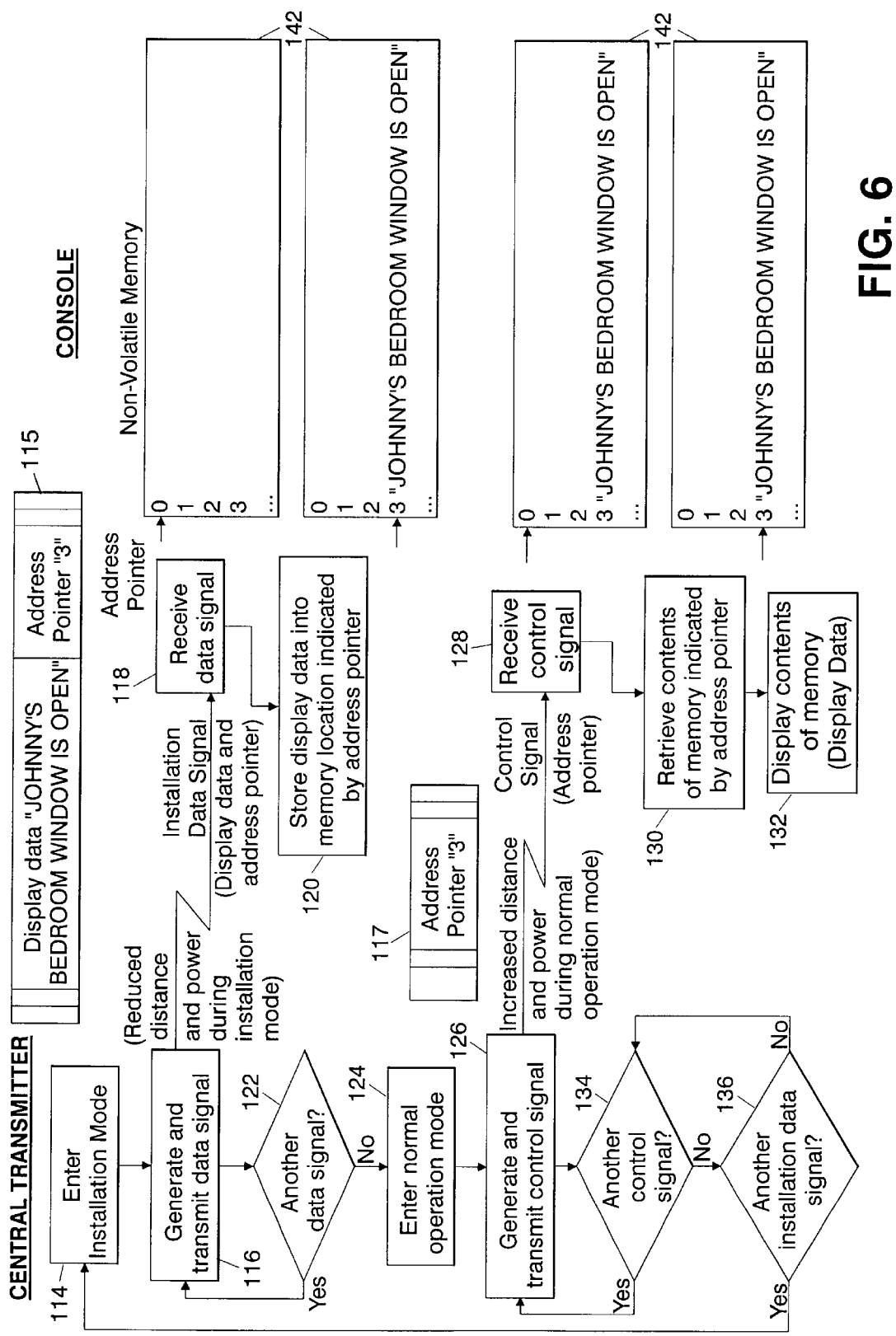
FIG. 6 is a flow chart illustrating operation of the dual power central transmitter and console including a method of storage and retrieval of data information in memory in a second embodiment of the present invention in which data signals are only transmitted during an installation mode.
Figure 7:
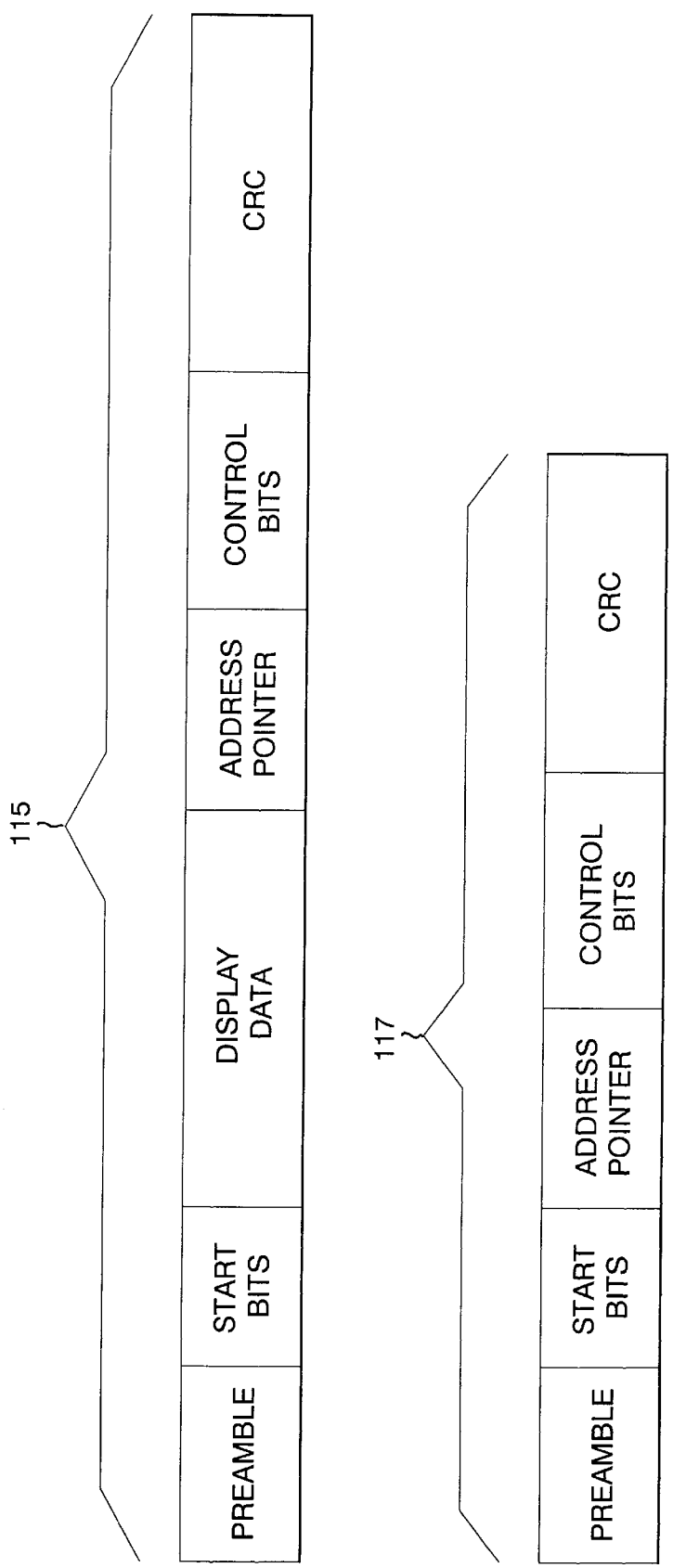
FIG. 7 illustrates components of a second embodiment of the data message and control message utilized in the operation of the second embodiment of the present invention illustrated in FIG. 6.

FIG. 6 illustrates the operation of a second embodiment of the present invention involving the dual power central transmitter wherein data signals are transmitted exclusively during an installation mode when the distance between the dual power central transmitter and the console can be relatively short. The security system is placed into installation mode by setting a switch, issuing a command or equivalent means well known in the art in step 114. The data signal is generated and transmitted by the dual power central transmitter in step 116 at a reduced power as required in accordance with FCC regulations. In addition, the dual power transmitter comprises means to ensure that the on-air time and duration of silent time between transmissions remain in compliance with FCC regulations. The reduced power in the transmission of the data signal during installation mode does not present a significant problem regarding errors in reception due to the decreased SNR since an installer is free to position the console at a reduced distance from the dual power transmitter during the installation mode. As illustrated in FIG. 7, the data signal comprises a data message 115 comprising display data and an address pointer as well as the preamble, start bits, control bits and CRC. The data signal 115 is transmitted at reduced power since according to FCC regulations the entire message is considered to be data.

Referring again to FIG. 6, the console receives the data signal in step 118 and stores the display data in the data signal into a memory location in the console indicated by the address pointer in the data signal. For example, as illustrated, assume that an address register within the console initially points to location zero in non-volatile memory 142. Upon receipt of the installation data signal comprising the display data representative of "Johnny's bedroom window is open" and the address pointer representative of three, an ASCII representation of the display data is stored in the non-volatile memory 142 location pointed to by the value of the address pointer transmitted in the data signal (i.e., three) in step 120 of FIG. 6. Assume also that some time following the transmission of the data signal, the value of the address pointer maintained in the console is optionally reset to zero as illustrated. Upon receipt of the control signal comprising the address pointer representative of three, the content of the non-volatile memory 142 location (i.e., "Johnny's bedroom window is open") pointed to by the value of the address pointer transmitted in the control signal (i.e., three) is retrieved and displayed to the user in steps 130 and 132. Naturally, the method just described could involve representing the display data using alternative coding techniques and the address pointer could be used with additional offsets and indices by means well known in the art. If an additional data signal is to be transmitted in step 122, then steps 116, 118 and 122 are selectively reiterated according to the user's requirements for additional data storage.

Upon completion of the installation mode, either temporarily or permanently, the dual power central transmitter enters a normal operation mode that does not require the transmission of data signals in step 124. The dual power central transmitter generates and transmits the control signal at normal power, in step 126, over a normal distance, which can be substantially greater than that over which the data signal is transmitted during the installation mode due to the increase in power levels for control signal transmissions permitted in accordance with FCC regulations. Thus, the user is able to successfully communicate with the dual power central transmitter via the console substantially anywhere within the area protected by the security system. As illustrated in FIG. 7, the control signal comprises a control message 117 comprising the address pointer as well as the preamble, start bits, control bits and CRC. Although the control and data messages are illustrated as comprising preambles, the preamble may be omitted in either the control or data message in reliance on the prior history of messages in order to determine the current content of the message without a preamble. For instance, the console can be designed to anticipate a data message after predetermined control messages, thereby alleviating the need for a preamble to be transmitted with the'data message. In such an embodiment, start bits are transmitted at the beginning of the message without the preamble.

It is important to note that the control signal 117 does not contain the display data and, due to this omission, the control signal 117 can be transmitted at higher power levels which increases the range over which the control signal can successfully be received without errors.

Referring again to FIG. 6, the console receives the control signal in step 128 and uses the address pointer contained therein to determine the memory location from which to retrieve the appropriate display data in step 130. The console then displays the retrieved display data to the user in step 132. Steps 126, 128, 130 and 132 are selectively reiterated if the user via the dual power central transmitter determining that additional control signals are to be transmitted in step 134. The dual power central transmitter re-enters installation mode, if it determines in step 136, that additional data signals are to be transmitted. If additional data signals are not required, step 134 is reiterated to determine whether additional control signals are required. Steps 134 and 136 represent a loop executed by the dual power central transmitter while waiting for subsequent data or control signals to be transmitted as initiated by the installer and/or user.

Figure 8:
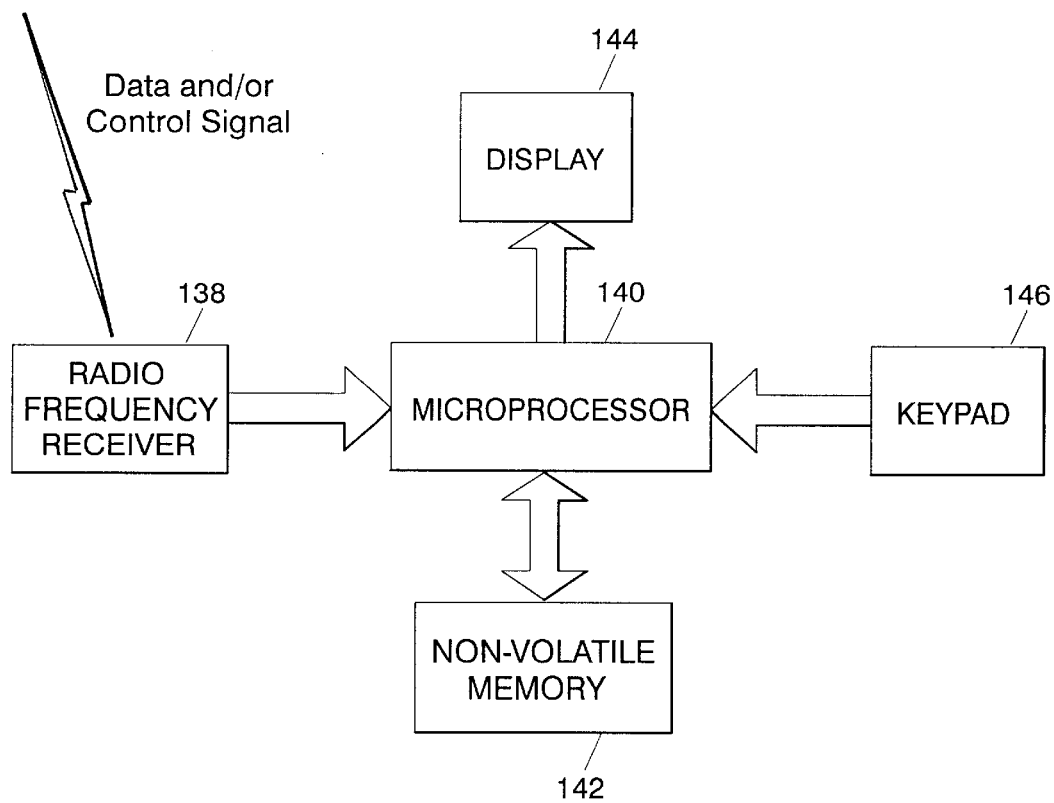
FIG. 8 is a block diagram of the console used in the operation of the second embodiment of the present invention illustrated in FIG. 6.

FIG. 8 illustrates a block diagram of the console utilized in the second embodiment of the present invention. A radio frequency receiver 138 receives the data signal and/or control signal from the dual power central transmitter and outputs the contents of the received signal in a digital format suitable for a microprocessor 140 by means well known in the art. In the case of a data signal, the microprocessor 140 extracts the display data and address pointer and stores the display data into a location in a non-volatile memory unit 142 pointed to, addressed, or indexed by the address pointer. In the case of a control signal, the microprocessor 140 extracts the address pointer and retrieves the display data from the location in the non-volatile memory unit 142 pointed to, addressed, or indexed by the address pointer. The retrieved display data is then displayed on a display 144 by the microprocessor 140. An optional keypad 146 is provided to permit manual entry of the display data and address pointer as well as additional control and access information well known in the art.

Thus, while particular embodiments of the present invention have been shown and described, various modifications will be apparent to those skilled in the art, and therefore it is not intended that the invention be limited to the disclosed embodiment or to details thereof and departures may be made therefrom within the spirit and scope of the present invention.

What is claimed is:

1. A wireless security system for maximizing transmission power levels, which comprises:
   an alarm sensor adapted to transmit a control signal;
   a central receiver adapted to receive said control signal;
   a central transmitter comprising
      a processing unit adapted to generate a modulating signal and a transmission power control signal, said modulating signal comprising a message, said message comprising control and/or data information, said transmission power control signal comprising one of at least two states at any given time dependent upon whether said message comprises data and/or control information,
      an oscillator adapted to generate a carrier signal,
      a modulator adapted to modulate said carrier signal with said modulating signal, said modulator adapted to control amplification of said modulated carrier signal in accordance with said state of said transmission power control signal, and
      an antenna adapted to radiate said modulated carrier signal;
   a control system adapted to communicate with said central receiver and said central transmitter; and
   a console adapted to receive a data and/or control signal comprising said modulated carrier signal from said central transmitter, said modulated carrier signal comprising said message, decode said message into control and/or data information, perform tasks associated with said control information, and display said data information.

2. The wireless security,system for maximizing transmission power levels of claim 1, wherein said modulator is adapted to control amplification of said modulated carrier signal to a normal power level when said transmission power control signal indicates said modulated carrier signal comprises control information.

3. The wireless security system for maximizing transmission power levels of claim 1, wherein said modulator is adapted to control amplification of said modulated carrier signal to a reduced power level when said transmission power control signal indicates said modulated carrier signal comprises data information.

4. A method for reducing a required quantity of data signal transmissions in wireless security systems, which comprises the steps of:
   transmitting a data signal comprising display data and an address pointer during an installation mode;
   receiving said data signal;
   storing said display data in a memory location indicated by said address pointer;
   transmitting a control signal comprising said address pointer during a normal operation mode;
   receiving said control signal;
   retrieving said display data from said memory location indicated by said address pointer; and
   displaying said display data.

5. The method for reducing a required quantity of data signal transmissions in wireless security systems of claim 4, wherein said data signal is transmitted at a reduced power level.

6. The method for reducing a required quantity of data signal transmissions in wireless security systems of claim 4, wherein said control signal is transmitted at a normal power level.

7. The method for reducing a required quantity of data signal transmissions in wireless security systems of claim 4, wherein said data signal is transmitted over a reduced distance during said installation mode.

8. The method for reducing a required quantity of data signal transmissions in wireless security systems of claim 4, wherein said control signal is transmitted over a normal distance during said normal operation mode.

9. The method for reducing a required quantity of data signal transmissions in wireless security systems of claim 4, wherein said steps of transmitting said data signal, receiving said data signal, and storing said display data are selectively iterated.

10. The method for reducing a required quantity of data signal transmissions in wireless security systems of claim 4, wherein said steps of transmitting said control signal, receiving said control signal, retrieving said display data, and displaying said display data are selectively iterated.

11. The method for reducing a required quantity of data signal transmissions in wireless security systems of claim 4, further comprising generating a transmission power control signal, said data signal and said control signal transmitted at a power level indicated by said transmission power control signal.

12. An apparatus for reducing a required quantity of data signal transmissions in wireless security systems, which comprises:
   means for transmitting a data signal comprising display data and an address pointer during an installation mode;

means for receiving said data signal;

means for storing said display data in a memory location indicated by said address pointer;

means for transmitting a control signal comprising said address pointer during a normal operation mode;

means for receiving said control signal;

means for retrieving said display data from said memory location indicated by said address pointer; and means for displaying said display data.

13. The apparatus for reducing a required quantity of data signal transmissions in wireless security systems of claim 12, wherein said means for transmitting said data signal is adapted to transmit said data signal at a reduced power level.

14. The apparatus for reducing a required quantity of data signal transmissions in wireless security systems of claim 12, wherein said means for transmitting said control signal is adapted to transmit said control signal at a normal power level.

15. The apparatus for reducing a required quantity of data signal transmissions in wireless security systems of claim 12, wherein said means for transmitting said data signal is adapted to transmit said data signal over a reduced distance during said installation mode.

16. The apparatus for reducing a required quantity of data signal transmissions in wireless security systems of claim 12, wherein said means for transmitting said control signal is adapted to transmit said control signal over a normal distance during said normal operation mode.

17. The apparatus for reducing a required quantity of data signal transmissions in wireless security systems of claim 12, further comprising means for generating a transmission power control signal, said data signal and said control signal transmitted at a power level indicated by said transmission power control signal.

18. An apparatus for reducing a required quantity of data signal transmissions in wireless security systems, which comprises:

a transmitter adapted to transmit a data signal comprising display data and an address pointer during an installation mode, said transmitter adapted to transmit a control signal comprising said address pointer during a normal operation mode;

a console adapted to receive said data signal and store said display data in a memory location indicated by said address pointer, said console adapted to receive said control signal, retrieve said display data from said memory location indicated by said address pointer, and display said display data.

19. The apparatus for reducing a required quantity of data signal transmissions in wireless security systems of claim 18, wherein said data signal is transmitted at a reduced power level.

20. The apparatus for reducing a required quantity of data signal transmissions in wireless security systems of claim 18, wherein said control signal is transmitted at a normal power level.

21. The apparatus for reducing a required quantity of data signal transmissions in wireless security systems of claim 18, wherein said data signal is transmitted over a reduced distance during said installation mode.

22. The apparatus for reducing a required quantity of data signal transmissions in wireless security systems of claim 18, wherein said control signal is transmitted over a normal distance during said normal operation mode.

23. The apparatus for reducing a required quantity of data signal transmissions in wireless security systems of claim 18, wherein said transmitter iteratively transmits said data signal and said console iteratively receives said data signal and stores said display data.

24. The apparatus for reducing a required quantity of data signal transmissions in wireless security systems of claim 18, wherein said transmitter iteratively transmits said control signal and said console iteratively receives said control signal, retrieves said display data, and displays said display data.

25. The apparatus for reducing a required quantity of data signal transmissions in wireless security systems of claim 18, wherein said transmitter generates a transmission power control signal and transmits said data signal and said control signal at a power level indicated by said transmission power control signal.

26. The apparatus for reducing a required quantity of data signal transmissions in wireless security systems of claim 18, wherein said console comprises a radio frequency receiver adapted to receive said data signal and said control signal, a memory unit, a display, and a microprocessor adapted to derive said display data and said address pointer from said data signal, said microprocessor adapted to store said display data in a location in said memory unit indicated by said address pointer, said microprocessor adapted to derive said address pointer from said control data, retrieve said display data from said location in said memory indicated by said address pointer, and display said display data on said display.

27. The apparatus for reducing a required quantity of data signal transmissions in wireless security systems of claim 26, wherein said console further comprises a keypad for manual entry of said display data and said address pointers.

28. The apparatus for reducing a required quantity of data signal transmissions in wireless security systems of claim 18, wherein said control signal further comprises a substantially unique preamble adapted to identify said control signal, start bits, control bits and a CRC.

29. The apparatus for reducing a required quantity of data signal transmissions in wireless security systems of claim 18, wherein said data signal further comprises a substantially unique preamble adapted to identify said data signal, start bits, control bits and a CRC.

* * * * *